United States Patent

Kamp et al.

[15] 3,650,788
[45] Mar. 21, 1972

[54] REACTIVE COAL TAR SYSTEM CONTAINING PHENOL REACTIVE COMPOUND

[72] Inventors: Woodrow E. Kamp, Pittsburgh; Lawrence F. Flaherty, Verona, both of Pa.

[73] Assignee: Koppers Company, Inc., Pittsburgh, Pa.

[22] Filed: Aug. 1, 1969

[21] Appl. No.: 862,117

Related U.S. Application Data

[62] Division of Ser. No. 610,895, Feb. 23, 1967, Pat. No. 3,514,316.

[52] U.S. Cl..............................106/287, 106/14, 106/273, 260/77.5 TB
[51] Int. Cl. ............................................................C09d 5/08
[58] Field of Search..................260/59, 28, 67 TN, 77.5 TB; 106/287, 273

[56] References Cited

UNITED STATES PATENTS

| | | | |
|---|---|---|---|
| 3,092,594 | 6/1963 | Heiss | 260/28 X |
| 3,182,032 | 5/1965 | Charlton et al. | 260/28 |
| 3,268,467 | 8/1966 | Rye et al. | 260/29.3 |
| 3,494,888 | 2/1970 | McElroy | 260/47 |

Primary Examiner—William H. Short
Assistant Examiner—E. Nielsen
Attorney—Olin E. Williams

[57] ABSTRACT

A reactive primer containing phenol-blocked isocyanate molecules and a compound capable of reacting with a phenol is applied to a metal substrate at ambient temperature. Subsequent application of a coal tar enamel at a temperature above 300° F. causes the isocyanate groups to unblock releasing the phenol which then reacts with the phenol reactive compound. The unblocked isocyanate bonds the enamel to the substrate.

3 Claims, 1 Drawing Figure

Patented March 21, 1972 3,650,788
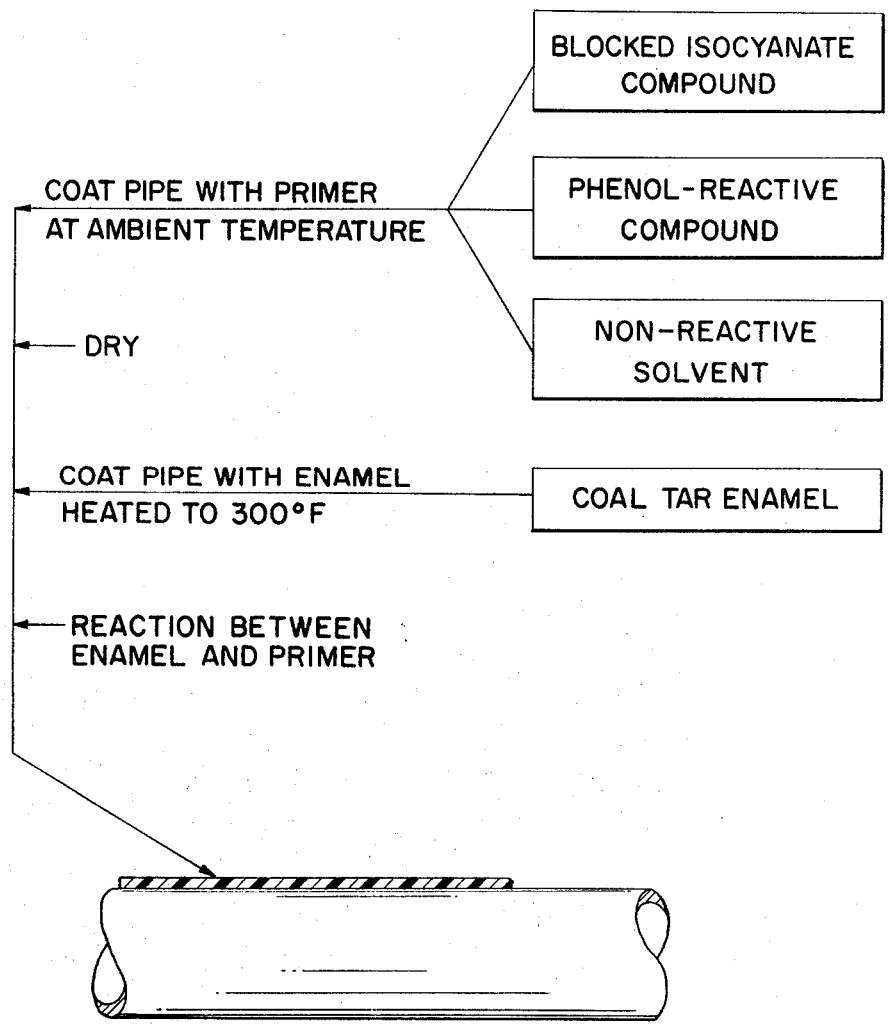
INVENTORS
WOODROW E. KEMP &
LAWRENCE F. FLAHERTY
BY

REACTIVE COAL TAR SYSTEM CONTAINING PHENOL REACTIVE COMPOUND

CROSS REFERENCE TO RELATED APPLICATIONS

This is a division of application Ser. No. 610,895, filed Jan. 23, 1967, now U.S. Pat. No. 3,514,316.

BACKGROUND OF THE INVENTION

Coal tar enamel has a long successful history as a coating for pipe for the prevention of corrosion. It has been the standard for coating water pipe and oil and gas pipe for years. However, the enamel does not adhere well to such pipe. In the application of coal tar enamel to pipe, the pipe must first be primed and then the enamel adheres to the primer and protects the pipe. Unless this adhesion between the pipe and primer and the primer and enamel is almost perfect under the temperature range anticipated, the coating may lose bond with the pipe. With water pipe, which is coated on both the exterior and interior, the adhesion of the interior coating is critical because if it loses bond, lines and meters will become plugged and inoperative, in addition to the onset of corrosion. On oil and gas lines, which are coated on the exterior, soil stress will rapidly remove enamel which has a bond deficiency. The problem is magnified when the lines are carrying oil or hot gases whose temperature tends to soften the primer and enamel, particularly affecting the adhesion through a lowering of tensile and cohesive strength. Oil lines, for example, are being heated to higher temperatures in order to reduce viscosity and increase flow rates, and gas lines are always at an elevated temperature for some distance downstream from a compressor station, and the tendency also is for temperatures to be increasingly higher as more compressors are added to increase the carrying capacity of the lines.

Primers based on a solution of coal tar pitch in a solvent were the first, and for many years, the only type primer employed. They were characterized by long drying times, low shelf and exposure life, and unpredictability in regard to bonding power with any specific enamel formulation.

Many resin systems were tried over the years as primers in an effort to overcome the deficiency of coal tar primers without success. Immediate and long-term incompatibility with the enamel always resulted. About 10 years ago, a resin system was finally found which showed none of the previous deficiencies. It dried rapidly, had long shelf and exposure life, and bonded all enamels irrespective of formulation. It was based primarily on chlorinated natural rubber. This primer has now been almost universally adopted by applicators of waterworks and is specified and approved by the waterworks industry.

The oil and gas industry attempted to adopt this synthetic primer for their enamel coating applications, but found it had one serious deficiency (in common with all chlorinated rubber compositions) namely, instability at temperatures over 140° F. for longer than 3-4 days. As gas and oil lines commonly operate at temperatures over 180° F. to as high as 210° F. (using special enamels) the fact that chlorinated rubber primers bonded the enamel to the substrate at normal temperature was of little value. Up until now, oil and gas lines were forced to use coal tar primers because the only synthetic primer available was not stable under their operation conditions.

Unfortunately, even coal tar pitch solvent primers are not always satisfactory under field operating conditions, and it is necessary to carefully match a primer with a specific batch of enamel to ensure a reasonable bond which is an expensive process.

These problems have led some to abandon the primer altogether in favor of single application coating systems which contain reactive ingredients which may be mixed together just prior to application.

For example, U.S. Pat. No. 3,092,594 teaches a coal tar based coating wherein the coal tar pitch is modified first by reacting it at an elevated temperature with an alkylene oxide and/or alkylene carbonate to produce side chains containing terminal hydroxyl groups capable of reacting with isocyanate groups. After cooling, the modified coal tar pitch is mixed with either a blocked or unblocked isocyanate and applied to a substrate. The coating may be applied hot or cold. However, the pot life would be relatively short and only small quantities could be used at one time. Even if a blocked isocyanate is used, the isocyanates will begin reacting as soon as the unblocking temperature is reached. If the coating (using a blocked isocyanate) is applied without heat, a subsequent bake is necessary to release the isocyanate.

U.S. Pat. No. 3,182,032 teaches the coal tar based coating containing triisocyanates and curing agents such as hydroxyl-containing compounds. The isocyanates are not blocked, and hence, the coating will cure at ambient temperatures. However, the coating must be packaged as a two-component system with the component containing the isocyanate and the component containing the curing agent being mixed just prior to application. The patent distinguishes triisocyanates and diisocyanates when used in ambient temperature cured coatings.

SUMMARY OF THE INVENTION

I have found that a primer consisting essentially of a phenol-blocked polyisocyanate and a compound capable of reacting with phenol is effective for use in conjunction with coal tar enamel. The blocked isocyanate is capable, when the coal tar is applied hot, of unblocking, thereby providing free isocyanate groups to form bonds with the reactive constituents in the coal tar and in addition to bond the coating to the metal substrate. The unblocking of the isocyanate releases the phenol which reacts with the phenol reactive compound. The released phenol is used up as fast as it is released and thus, there is never an excess of phenol present which might inhibit the complete unblocking of the isocyanate and reaction with the coal tar due to the reversibility of the isocyanate-hydroxyl reaction. The use of a blocked isocyanate in the primer is essential. Unblocked isocyanates are either highly toxic, too volatile, or are effected by atmospheric moisture. The blocking of the isocyanate with a monohydric phenol permits the active functional isocyanate group to become available at the appropriate time for reaction with the coal tar. The presence, in the primer, of a compound capable of reacting with phenol eliminates the problem of phenol removal. Without such a compound, it is necessary to place certain weight limitations on the isocyanate molecule to limit the amount of phenol released, and thus, inhibit reversing of the reaction. In the preferred embodiment of my invention, the reaction to form a tough resistant bond between the coal tar enamel and the substrate is very rapid. For example, if the compound capable of reacting with phenol were not employed, the rate of cure would be slowed down considerably because of the problem of phenol removal because the escape of the phenol would be dependent upon the rate of the diffusion of the phenolic body into the coal tar enamel constituent. The molecular weight of the isocyanate compound (without the monohydric phenol) in such a case would be limited so that it would have to comprise at least 50 percent by weight of the total weight of the blocked isocyanate compound including the monohydric phenol blocking members. This would insure that the amount of phenol relative to the total weight of the primer would be sufficiently low to prevent slow down of the reaction by inability of the phenol to escape and diffuse into the enamel. In contrast no such limitations as to weight of the isocyanate compound are necessary in this invention.

In accordance with this invention, the metal substrate is primed at ambient temperature with a primer consisting essentially of a blocked polyisocyanate having a plurality of phenol-blocked isocyanate groups, and a compound capable of reacting with a phenol, said blocked polyisocyanate being formed by the reaction of the isocyanate groups with monohydric phenol. Coal tar enamel, at an elevated temperature of at least 300° F. is then applied over the primer, which temperature will cause the primer to generate isocyanates which react to form bonds in the nature of the chemical bonds between the coal tar enamel and the metal, said primer generating isocyanates by the unblocking of the phenol-blocked isocyanate groups which releases the phenol, said phenol then reacting with said compound capable of reacting with a phenol, said phenol reaction acting to drive the reaction of the isocyanate with the coal tar to completion.

In accordance with this invention, the conventional treatment of pipe with a primer and later with a coal tar enamel can be carried out. However, in accordance with this invention, at the temperatures of application of the enamel to the primed substrate, a reaction occurs between the enamel and the primer to provide an adhesion which has the resemblance of a chemical bond between the enamel and the substrate surface. Accordingly, with this invention, the present practices of protecting pipe coatings, with which those working in the field are familiar, do not need to be altered to obtain these surprising results of the invention.

BRIEF DESCRIPTION OF THE DRAWINGS

The drawing is flow sheet depicting the novel isocyanate primer system of the invention.

DETAILED DESCRIPTION

The blocked isocyanate primer generates reactive isocyanates upon being heated by volatilization of the phenol blocking groups. The free isocyanate groups then react with the coal tar enamel and the metal as the coal tar cools forming bonds in the nature of chemical bonds.

The primer is initially formed by the esterification of a compound containing a plurality of isocyanate groups with monohydric phenols to form carbamate type esters.

The isocyanate + phenol reaction to form the carbamate ester as typically illustrated in equation I below is reversible with heat. Therefore, while the primer is stable at its application temperature, the heat of the coal tar enamel causes the reverse reaction to occur thus freeing the isocyanate:

I.

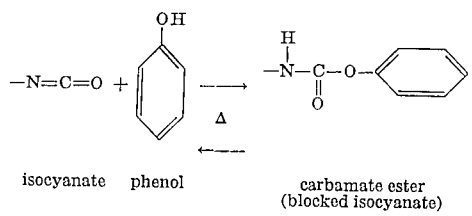

isocyanate   phenol          carbamate ester
                                        (blocked isocyanate)

Isocyanate compounds useful in this invention are those containing a plurality of isocyanate groups which may be blocked by reaction with monohydric phenols. Such polyisocyanate compounds useful in this invention are the following:

a. simple isocyanates having the following structure:

OCN—R—NCO where R is selected from the group consisting of lower alkylene,

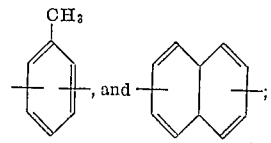

;

examples of such isocyanates include: hexalmethylene diisocyanate, 2,4-toluene diisocyanate, 2,6-toluene diisocyanate and 1,5-naphthalene diisocyanate;

b. bis-phenylene diisocyanates and bis-phenylene triisocyanates having the following structure:

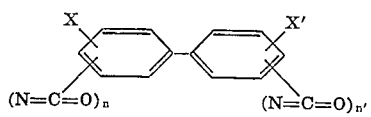

where X and X' are the same or different and are selected from the group consisting of hydrogen, halogen, lower alkyl, lower alkoxy and phenyl; and $n$ and $n'$ are each 1–2 and the sum of $n + n'$ is from 2–3;

examples of isocyanates corresponding to the above formula include: 4,4'-diisocyanato biphenyl; 3,3'-dimethyl-4,4'-diisocyanato biphenyl; 3,3'-dimethoxy-4,4'-diisocyanato biphenyl; 3,3'-diphenyl-4,4'-diisocyanato biphenyl; 3,3'-dichloro-4,4'-diisocyanato biphenyl; 2,4,4'-triisocyanato biphenyl; 2,3',4-triisocyanato-4'-methyl biphenyl; 2,4,4'-triisocyanato-3'-methyl biphenyl; 2,4,4'-triisocyanato-5-methyl biphenyl; 2,2',4-triisocyanato-5-methyl biphenyl; 2,4,4'-triisocyanato-6-chloro biphenyl; 2,3',4-triisocyanato-4',5-dimethyl biphenyl; 2,4,4'-triisocyanato-3'-methoxy-5-methyl biphenyl; 2,4,4'-triisocyanato-3',5-dichloro diphenyl; 2,2',4-triisocyanato-5,5'-dichloro diphenyl; 2,3',4-triisocyanato-4'-methoxy diphenyl; 2,4,4'-triisocyanato-3'-methoxy diphenyl; 2,4,4'-triisocyanato-5-methoxy diphenyl; 2,2',4-triisocyanato-5-methoxy diphenyl; 2,4,4'-triisocyanato-5-chloro diphenyl; 2,3',4-triisocyanato-4'-chloro diphenyl; 2,4,4'-triisocyanato-3'-chloro diphenyl; 2,2',4-triisocyanato-5-chloro diphenyl;

c. isocyanato-bis-phenylene ethers, bis-phenylene alkylene ethers and isocyanato-bis-phenylene alkanes having the following structure:

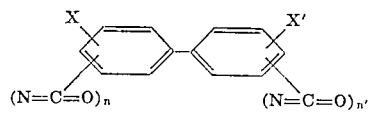

where X and X' are the same or different and are selected from the group consisting of hydrogen, halogen, lower alkyl, lower alkoxy and phenyl; Y is —O—, —R— or —ROR'— wherein R and R' are the same or different aliphatic saturated hydrocarbon radicals having from one to six carbon atoms; and $n$ and $n'$ are each 1–2 and the sum of $n + n'$ is from 2–3;

examples of isocyanates corresponding to the above formula include: 4,4'-diisocyanato-diphenylene ether; 3,3'-dimethyl-4,4'-diisocyanato-diphenylene ether; 3,3'-dimethoxy-4,4'-diisocyanato-diphenylene ether; 3,3'-dichloro-4,4'-diisocyanato-diphenylene ether; 3,3'-diphenyl-4,4'-diisocyanato-diphenylene ether; 4'-methyl-2,3',4-triisocyanato-diphenylene ether; 5-methoxy-2,4,4'-triisocyanato-diphenylene ether, 6-chloro-2,4,4'-triisocyanato-diphenylene ether; 4,4'-diisocyanato-diphenyl methane, 3,3'-dimethyl-4,4'-diisocyanato-diphenylene methane; 3,3'-dimethoxy-4,4'-diisocyanato-diphenylene methane; 3,3'-dichloro-4,4'-diisocyanato-diphenylene methane; 3,3'-diphenyl-4,4'-diisocyanato-diphenylene methane; 4,4'-diisocyanato-diphenylene ethane; bis(4-isocyanato-phenylene methylene)ether; bis(3-methy-4-isocyanato-phenylene ethylene)ether; bis(3-chloro-4-isocyanato-phenylene methylene)ether; bis(3-methoxy-4-isocyanato-phenylene methylene)ether;

d. isocyanato-tris-phenylene alkanes having the following structure:

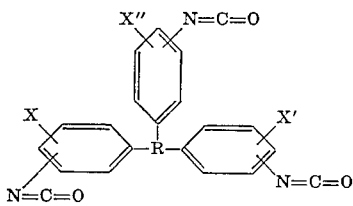

R is a trifunctional aliphatic saturated hydrocarbon radical having from 1 to 6 carbon atoms;

X, X' and X'' are the same or different and are selected from the group consisting of hydrogen, halogen, lower alkyl, lower alkoxy and phenyl;

examples of isocyanatos corresponding to the above formula include: 4,4',4'''-triisocyanato-triphenylene methane; tris(3-methyl-4-isocyanato-phenylene)methane; tris(3-methoxy-4-isocyanato-phenylene)methane; tris(3-chloro-4-isocyanato-phenylene)methane;

e. polymethylene polyphenyl polyisocyanates having the following structure:

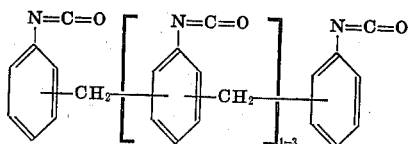

are useful in the practice of this invention.

f. Also useful are adducts made from the above isocyanate compounds. The adducts are made by reacting 3 moles of the isocyanate compound with a polyhydroxy compound such as a triol or a polyether. One of the isocyanate radicals reacts with a hydroxyl to form a carbamate ester or urethane linkage while the other isocyanate (or isocyanates if a triisocyanate is reacted with the polyol) does not react with the polyol, but is later blocked by reaction with a phenol.

Such adducts have the general structural formula:

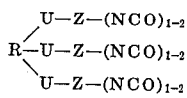

where R is a trifunctional aliphatic saturated hydrocarbon radical having from one to six carbon atoms or a polyether radical having a molecular weight of up to 20,000. U represents the urethane linkage:

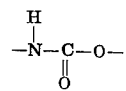

formed by the hydroxyl and isocyanate, and Z represents the radicals previously described in a) through e).

Examples of useful polyhydroxy compounds include: 1,2,3-propanetriol; 1,2,3-trimethylol propane; 3-methylol-2,4-pentanediol; 1,2,6-hexanetriol; 2,2'-dimethylol-1,3-propanediol (pentaerythritol); polyoxypropylene triol.

Suitable monohydric phenols which may be used as blocking agents include phenol, monomethylphenols, chlorophenols, nitrophenols, o-methoxyphenol, 1,2-benzenediol, 1,3-benzenediol, and 1,3,5-benzenetriol.

Suitable compounds capable of reacting with phenol are the epoxy compounds and higher molecular weight aldehydes. The compound must be capable of reacting quickly with the phenol as it is released. The compound also must have a low volatility so as not to vaporize upon being heated by the hot coal tar. This excludes some of the simpler low molecular weight aldehydes such as formaldehyde and acetaldehyde in their monomeric form. The compound should react with the phenol to form a relatively non-reactive product which will not interfere or compete with the bonding reaction between the isocyanate and the coal tar enamel.

Suitable epoxy compounds are the following:

a. monoepoxy compounds corresponding to the following structural formula:

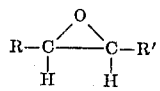

where R is hydrogen; alkyl having one to 18 carbons; alkenyl having one to 18 carbons;

where A is lower alkylene; phenyl;

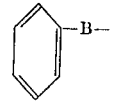

where B is lower alkylene;
D—O—CH$_2$— where D is lower alkyl;

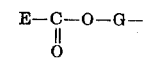

where E is lower alkyl or lower alkenyl and G is lower alkylene; or

where J is fluorine, chlorine, bromine or iodine, and R' is hydrogen, lower alkyl;

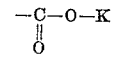

where K=hydrogen, or lower alkyl; or

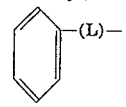

where L is lower alkylene.

b. diepoxy compounds corresponding to the following structural formula:

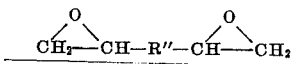

where R'' is: lower alkylene; M = M' where M and M' are the same or different lower alkylenes; MOM where M and M' are the same or different lower alkylenes; phenylene;

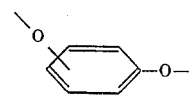

biphenylene;

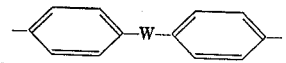

where W is lower alkylene or —X—O—X'—where X and X' are the same or different lower alkylene; or

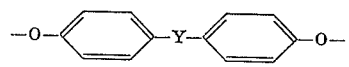

where Y is lower alkylene or —Z—O—Z'—where Z and Z' are the same or different lower alkylene.

c. Polyglycidyl ethers corresponding to the following structural formula:

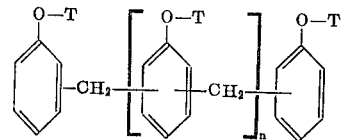

where n is an integer from 1–20 and T is

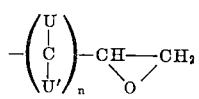

where n is 1–10 and U and U' are the same or different and are selected from the class consisting of hydrogen, lower alkyl and phenyl.

d. Epoxy compounds having the following structural formula:

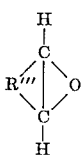

R''' = lower alkylene, lower alkenylene and lower alkoxylene.

Suitable higher molecular weight aldehydes include:
a) linear aldehydes having the formula:

where R is a lower alkyl having at least two carbon atoms or a lower alkenyl having at least two carbon atoms;
b. cyclic or polymeric aldehydes such as:

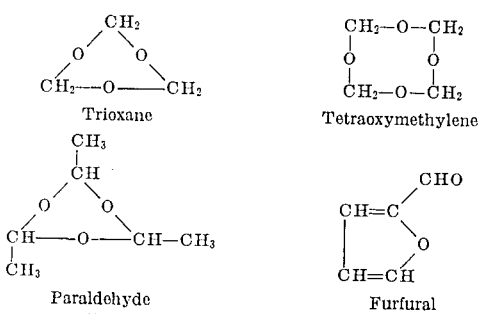

c. linear low molecular weight oxyalkylene polymers which decompose into lower aldehydes, such linear low molecular weight oxyalkylene polymers have having the formula:

where R is hydrogen, methylene, or ethylene and n is 2–100.

The preferred amount of epoxy compound or aldehyde used in the primer is the stoichiometric equivalent to the amount of phenol which will be released. Lesser amounts result in excess amounts of liberated unreacted phenol which in turn slows down the unblocking of the isocyanate. Excessive amounts of epoxy compound or aldehyde, on the other hand, are unnecessary, expensive, and actually may detract from the functionality of the primer by "loading" it with non-reactive ingredients.

The blocked isocyanate and the phenol reacting compound are mixed with a non-reactive solvent such as, for example, xylene, toluene, ethyl acetate, cellosolve acetate, ketones or nitro compounds such as nitropropane, nitrobenzene or the like. The amount of solvent used will depend on the desired consistency of the primer for the mode of application such as brushing, dipping, or spraying, or the like. A concentration of about, for example, 30 percent by weight solids is usually satisfactory. If the particular mixture is insoluble in the above solvents, it may be emulsified in water.

The coal tar enamels used in the system are well known in the art and readily available. The critical limitation in the use of the enamel in the invention is that the enamels must be applied at temperatures above 300° F. to ensure unblocking of the isocyanate in the primer. Suitable coal tar enamels are commercially available as BITUMASTIC coatings from the Koppers Company, Inc. They are normally hot applied at a temperature above 300° F. in the thicknesses of about 100 mils. The enamel may be applied by pouring, spreading, mopping, brushing, or the like.

The invention will be more clearly understood by referring to the appended flow sheet and the following examples.

EXAMPLE I

Nine hundred fourty grams of a phenol-blocked isocyanate adduct sold under the trademark MONDUR S (an adduct formed by reacting a molar amount of trimethylol propane with 3 moles of toluene diisocyanate) and 90 grams of trioxane were dissolved in 3,500 grams of methyl ethyl ketone. The solution was applied as a primer to a bare metal substrate at ambient temperatures as a thin (approximately 1 mil) film and allowed to dry. A coal tar enamel was heated to a temperature of 475° F. and then applied over the primer at this temperature. The heat of the enamel released the phenol blocking member enabling the isocyanate groups to react with the enamel and firmly bond the enamel to the metal substrate. At the same time, the heat of the enamel decomposed the trioxane into its phenol reactive aldehyde constituents, thus insuring against reformation of the phenol-isocyanate bond as the reaction mass cooled. Subsequent examination of the coating, including chipping off portions of the enamel and attempts to chemically dissolve the coating with methyl ethyl ketone (the original solvent for the primer) confirmed that an excellent bond have been formed between the enamel and the metal substrate.

EXAMPLE II

One hundred grams (0.28 moles) of phenol-blocked toluene diisocyanate (TDI) was emulsified in 320 grams of water to form a primer. A second primer was prepared by emulsifying 28.5 grams (0.40 moles) of butylene oxide and 71.5 grams (0.20 moles) of phenol-blocked toluene diisocyanate in 320 grams of water.

Each primer was applied in a 1–2 mil film to a metal substrate, labeled A and B, dried and a hot coal tar enamel applied over the primer. After 24 hours, the two coated substrates were immersed in xylene for 5 hours to dissolve off the coal tar enamel. The first sample (A), having been primed with the primer containing only the phenol blocked toluene diisocyanate, lost almost its entire coating while sample (B) having been primed with the primer containing the phenylblocked toluene diisocyanate and the phenol reactive compound butylene oxide retained a 1–2 mil film thereon.

The results indicated that the isocyanate in the first primer did not react with the coal tar and metal substrate due to the excess phenol released when the isocyanate unblocked, while in the second primer, the butylene oxide by reacting with the phenol prevented the phenol from "re-blocking" the isocyanate as the reaction cooled, thus allowing the free isocyanate to bond with the coal tar and metal substrate.

EXAMPLE III

Phenol-blocked hexamethylene diisocyanate was mixed in stoichiometric equivalent amounts with each of the following phenol reactive compounds and emulsified in water to a 30 percent solids content to form primers:
Trioxane
Furfural
Paraldehyde
Propionaldehyde
Butyraldehyde
Paraformaldehyde (molecular wt. 300)
Butylene oxide
Styrene oxide
Diglycidyl ether of bisphenol A
Epoxidized vegetable oil
Poly novalak glycidyl ether In each case, the procedure of Example I was carried out. The resulting coated substrates and excellent bonding between substrate and enamel.

Trioxane, styrene oxide and diglycidyl ether of bisphenol A were also used with higher molecular weight isocyanates, 4,4'-diisocyanato biphenyl and 4,4',4''-triisocyanato-triphenylene methane to form primers which were subsequently cured by hot coal tar enamel. While the effect was not as marked as with the low molecular weight isocyanates, it was noted that excellent bonding was achieved in much shorter periods of time when the phenol reactive additive was present than when the additive was omitted.

The invention thus provides a system whereby a coal tar enamel may be bonded to a metal substrate by means of a reactive primer containing blocked isocyanates. The primer is activated by the application of the hot coal tar enamel which unblocks the isocyanates. The chemical bonds formed by the isocyanate-containing primer are stable, enabling the continuous and sustained use of the coated pipe at high temperatures, i.e. over 180° F., up to as high as 220° F. The primer contains an additional phenol reactive compound which will react with the phenol released when the blocked isocyanate is unblocked by the hot enamel. Thus, the phenol by reacting with this additional compound is not free to recombine with the isocyanate groups after the enamel cools. A complete and fast bonding reaction between the coal tar enamel isocyanate primer and metal substrate is thereby assured. Both the enamel and the primer are stable and capable of good storage and pot life; the enamel because it does not contain reactive additives, and the primer because it is applied at ambient temperatures which are well below the critical temperature at which its constituents become reactive. Although the invention has been illustrated with coal tar enamel, it should be understood that the use of the primer with any hot applied enamel including bituminous enamels derived from either coal tar or asphalt, is within the scope of the invention.

I claim:

1. A reactive primer for coating metal substrates, said primer consisting essentially of:
   a. a blocked polyisocyanate having a plurality of phenol-blocked isocyanate groups, formed by reacting a compound containing reactive isocyanate groups with a monohydric phenol to block said isocyanate groups; and
   b. a compound capable of reacting with a phenol, said compound being selected from the group consisting of mono-oxirane compound and polyoxirane compound,
   said reactive primer upon the application thereon of a hot coal tar enamel at an elevated temperature of at least 300° F. generating isocyanates by the unblocking of the phenol blocked isocyanate groups to bond the enamel to the metal substrate, said unblocking of the phenol blocked isocyanate groups releasing phenol which reacts with said compound that is capable of reacting with a phenol.

2. A reactive primer for coating metal substrates, said primer consisting essentially of:
   a. a blocked polyisocyanate having a plurality of phenol-blocked isocyanate groups, formed by reacting a compound containing reactive isocyanate groups with a monohydric phenol to block isocyanate groups; and
   b. a compound that is capable of reacting with a phenol and that is selected from the class consisting of oxirane compounds and higher molecular weight aldehydes;
   said reactive primer upon the application thereon of hot coal tar enamel at an elevated temperature of at least 300°F. generating isocyanates by the unblocking of the phenol-blocked isocyanate groups to bond the enamels to the metal substrate, said unblocking of the phenol-blocked isocyanate groups releasing phenol which reacts with such compound capable of reacting with a phenol.

3. The primer composition of claim 1 wherein the mono-oxirane compound has the structural formula:

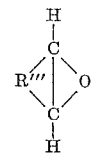

wherein R''' is lower alkylene, lower alkenylene, and lower alkoxylene.

* * * * *